W. C. MORROW.
GRADOMETER.
APPLICATION FILED JULY 10, 1916.
1,219,341.
Patented Mar. 13, 1917.
Fig. 1.
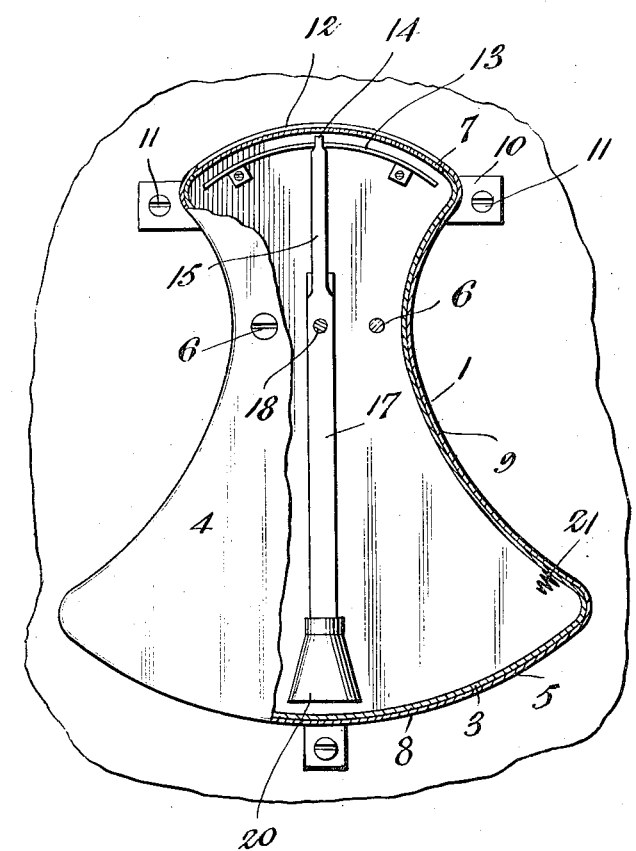
Fig. 3.
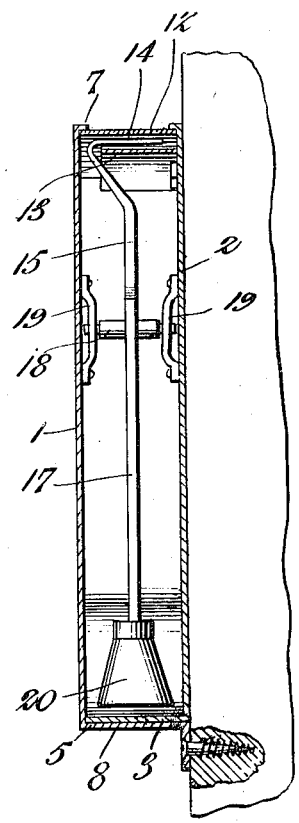
Fig. 2.
Witnesses
Frederick W. Ely
Inventor
W. C. Morrow.
By Victor J. Evans
Attorney

UNITED STATES PATENT OFFICE.

WILLIAM CHRISTOPHER MORROW, OF DES MOINES, NEW MEXICO.

GRADOMETER.

1,219,341.  Specification of Letters Patent.  Patented Mar. 13, 1917.

Application filed July 10, 1916. Serial No. 108,469.

*To all whom it may concern:*

Be it known that I, WILLIAM C. MORROW, a citizen of the United States, residing at Des Moines, in the county of Union and State of New Mexico, have invented new and useful Improvements in Gradometers, of which the following is a specification.

This invention relates to a gradometer or inclinometer, designed for use in indicating the dip, inclination or grade of a road or other surface, and particularly as an attachment for automobiles and other road vehicles.

The object of the invention is to provide a simple, reliable and efficient type of gradometer or inclinometer which may be attached at a suitable point to the vehicle, whereby the driver of the vehicle may readily and conveniently determine the inclination or declination of the road over which the vehicle is traveling.

The invention consists of the features of construction, combination and arrangement of parts hereinafter fully described and claimed, reference being had to the accompanying drawing in which:—

Figure 1 is a view showing the instrument in front elevation, and with the front of the casing partially broken away, and showing the application of the device.

Fig. 2 is a top plan view of the device.

Fig. 3 is a vertical front to rear section taken on a plane parallel with the axis of the weighted or plumb lever.

Referring to the drawing, 1 designates a casing, preferably composed of a back plate 2 having a forwardly extending marginal flange 3 and a front plate 4 having a rearwardly extending marginal flange 5, the flanges of said front and back plates being arranged to telescope or slidably interfit, whereby the sections of the casing are connected together. Screws or other suitable fastenings 6 are provided to detachably hold the said casing sections in connected relation.

The casing is preferably of such form as to provide a segmental top portion 7, a segmental bottom portion 8, which extends on an arc of greater radius than the portion 7, and end walls formed by the flanges 3 and 5 which slope so as to provide a narrowed waist portion 9 at a point adjacent to the center of the casing or between its center and top. Attaching bracket plates 10 are provided upon the back plate 2 for the passage of suitable fastenings 11 to secure the instrument to one of the side walls or doors of an automobile or other vehicle, so that the front plate 4 will face inwardly and the top 7 lie in position to be conveniently observed by the driver of the vehicle from a point above.

The top portion 7 is provided with an observation slot 12 to expose a segmental scale plate 13 fixed to the back plate 2 and extending concentric with the slot 12. This scale plate is provided with scale graduations for coöperation with a pointer or indicating finger 14, the scale indications extending in opposite directions from a zero point to designate inclinations or declinations of grade up to, say, 60 degrees from the horizontal, or any range of degrees as may be found most suitable or desirable according to the particular use for which the instrument is intended.

The pointer or indicator 14 is carried by an arm 15 which is preferably integral with a depending lever 17, said arm and lever being, at their point of junction, carried by a horizontal shaft or axis 18 journaled in bearing brackets 19 secured to the plates 2 and 4, the lever 17 being provided at its lower end with a weight 20 and acting as a pendulum normally held by gravity in a perpendicular position.

In the use of the device it is secured to the portion of the vehicle to which it is to be fastened so that when the vehicle is standing on a level the weighted lever or pendulum will be in a truly perpendicular position with the indicator 14 pointing at the zero mark on the gradometer scale. It will thus be evident that as the vehicle dips or inclines in a forward or backward direction the lever and pointer will maintain a perpendicular position, but the casing and scale will shift relatively thereto and thus indicate by the position of the pointer on the scale degree of inclination or declination of the grade. By this means and in this manner the driver of the vehicle may always be kept advised of the degree of the grade over which the vehicle is traveling at any time, and it will be observed that a simple, inexpensive and reliable type of instrument is provided for this purpose.

It will, of course, be understood that the device may be made of any suitable material or materials, of any desired size and of any desired degree of ornamentality, but that in a simple and yet pleasing form may be made and sold at a comparatively low cost and so as to be applied and used in a ready, easy and convenient manner. Buffer springs 21, preferably of the coiled type, are provided within the casing for limiting and cushioning the movements of the pendulum lever.

I claim:—

A gradometer comprising a casing formed of connected front and back plates, said back plate being provided with means for attachment to a vehicle body, and said casing having an arcuate top part provided with an observation slot; an arcuate scale plate disposed adjacent to and in spaced relation to said observation slot, said scale plate being secured to one of the plates of the casing and spaced from the other plate of the casing, a lever pivotally mounted within the casing and having an upwardly extending arm, a weight carried by the lever, and an angularly disposed pointer carried by the upwardly extending arm and movable in the space between the scale plate and the observation slot in the arcuate top part of the casing.

In testimony whereof I affix my signature.

WILLIAM CHRISTOPHER MORROW.